A. M. LEVIN.
APPARATUS FOR THE MEASUREMENT OF FLUIDS.
APPLICATION FILED APR. 13, 1914.
1,181,490.
Patented May 2, 1916.
Fig. 1.
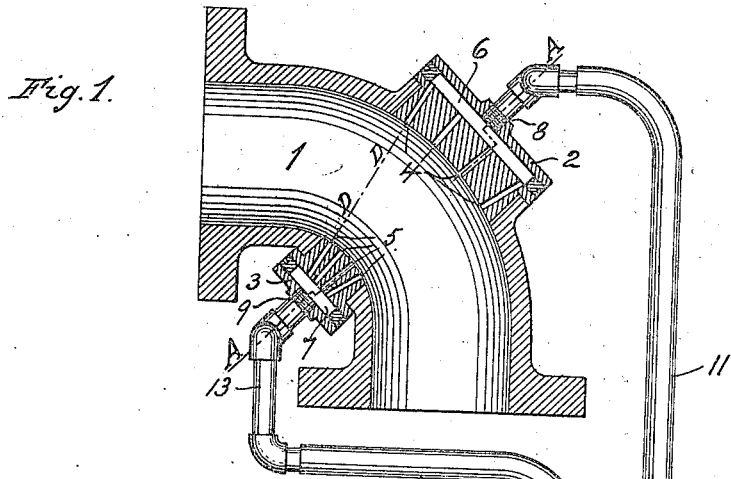
Fig. 2.
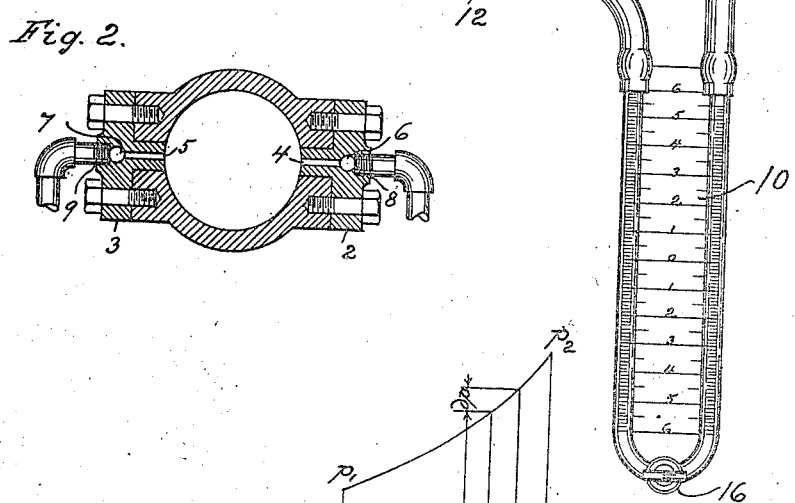
$C$ = CENTRIFUGAL FORCE
$\omega$ = ANGULAR VELOCITY
$r$ = INSIDE RADIUS OF BEND
$R$ = OUTSIDE RADIUS OF BEND
$\alpha$ = SECTIONAL AREA OF $m$
$m$ = MASS
$\delta$ = DENSITY
WITNESSES:
M. Berg
Jas Finn
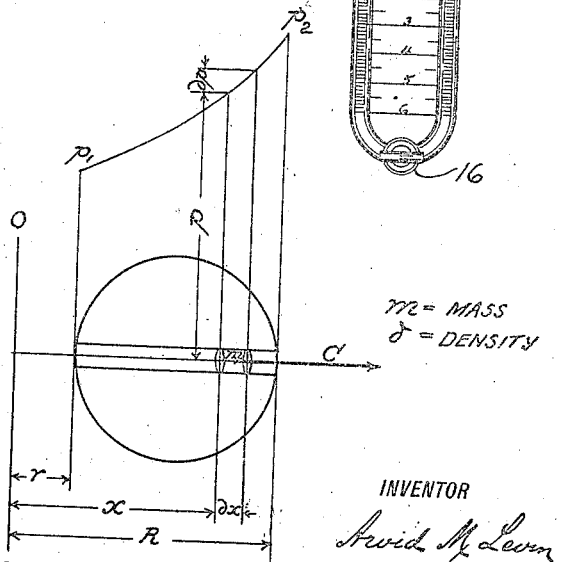
Fig. 3.
INVENTOR
Arvid M Levin

UNITED STATES PATENT OFFICE.

ARVID M. LEVIN, OF CHICAGO, ILLINOIS.

APPARATUS FOR THE MEASUREMENT OF FLUIDS.

1,181,490.  Specification of Letters Patent.  Patented May 2, 1916.

Application filed April 13, 1914. Serial No. 831,684.

*To all whom it may concern:*

Be it known that I, ARVID M. LEVIN, a citizen of the United States, residing at Chicago, in the county of Cook and State of Illinois, have invented a new and useful Apparatus for the Measurement of Fluids, of which the following is a specification.

The invention relates to that class of measuring apparatus used particularly for the measurement of the velocity of flow of liquids or gases in closed channels. In the generally employed flow measuring instruments of this class, the determination of the velocity of flow is based on the established change in the pressure of the fluid that will result from a certain definite change in its velocity. With respect to incompressible fluids, such as water, the generally employed instruments, the Pitot tube and Venturi meter, have proven satisfactory and reliable; but with respect to compressible fluids, such as steam, air or gases generally they lack in accuracy, on the ground that the inertia pressure varies throughout a given section of the conduit, not only because of variations in the velocity due to ordinary frictional resistances but also because of eddies and whirls in the fluid itself.

With the present invention, which is particularly intended for the measurement of compressible fluids, in which there can hardly, without exceptional precautions, be expected to exist an even approximately uniform current, it is contemplated to establish the centrifugal pressure that must be due to a certain definite change in the direction of motion of the fluid, and to use this centrifugal pressure as a basis for the determination of the velocity or volume of flow. This object is attained by the apparatus illustrated in Figures 1 and 2 of the accompanying drawing, of which—

Fig. 1 is a longitudinal section through the apparatus, in connection with pressure indicating instruments shown in elevation; Fig. 2 is a cross section on the line A A of Fig. 1. Fig. 3 is a diagrammatical illustration showing how the forces act upon the fluid passing through the apparatus and it is submitted for the purpose of serving as a key to the deduction of certain necessary formulas which will be given in the following.

Similar figures refer to similar parts throughout the several views.

The apparatus consists essentially of an elbow or bend 1, Fig. 1, which may be any shape in cross section, shown respectively by Fig. 2 and Fig. 3.

2 and 3 are nozzle-plugs extending through respectively the outer and the inner curved wall of the bend and conforming at their inward extremity with the curvature of the bend so as to form a smooth channel throughout the sweep of the bend.

4 are pressure ports extending from the outer curved wall of the bend and communicating with a common pressure chamber 6, while 5 are pressure ports extending from the inner curved wall of the bend and communicating with a common pressure chamber 7. The pressure chambers 6 and 7 terminate in the pipe connections 8 and 9.

10 is a U-tube manometer, and 11, 12 and 13 are pipes connecting the terminals of the U-tube with the pressure chambers 6 and 7.

16 is a plug cock which has for its object to enable the operator to throttle the liquid in the U-tube sufficiently to make it perfectly steady when reading the instrument.

In employing the apparatus, it is inserted as an elementary part of the channel which conducts the fluid to be measured, and the pressure chambers 6 and 7 are connected to any suitable pressure reading instrument for determining the pressures created in these chambers, as for instance with the manometer 10 shown in the illustration. It will be evident that, as the fluid passes through the bend, a certain centrifugal force must be exerted in changing the course of the fluid. The value of this centrifugal force will be quite definite, depending on the velocity with which the fluid passes, and it will cause the pressure at the outer pressure-ports, 4, to increase while the pressure at the inner pressure ports, 5, decreases. The new pressures thus obtained at the pressure-ports will also vary with the velocity of the fluid, and they will be essentially independent of any irregularities or whirls inside the body of the fluid. This will be understood when the fact is considered that it takes exactly the same force to change the linear course of a whirling mass as that required to change the course of the same mass flowing smoothly. Generally there will of course obtain in the fluid pulsations and waves which become transmitted directly to the walls of the flow bend, and which thus would variously affect the centrifugal pressures established at individual points of the wall surface. For that reason, in order to average up the slightly varying pressures at different points over a comparatively large part of the wall surface into a mean pressure which approximates the true pressure due to centrifugal force alone, a number of pressure ports are provided at the inner and at the outer curved wall of the bend; each set of pressure ports communicating with a common pressure chamber. The pressure difference between the outer and inner pressure ports being quite sensitive for variations in the velocity of the passing fluid, and it being practically unaffected by incidental eddies and whirls in the fluid itself, it will serve very correctly, if carefully measured, as a gage for the velocity of flow. For the reduction of the pressures registered by the indicating instruments into velocity of flow, certain formulas will be required. These formulas are quite simple, and may be deduced as follows:—Let Fig. 3 represent a cross section normal to the axis of the flow bend, such as a section through line D D of Fig. 1, O O being an axis through the center of curvature of the bend; and let $m$ represent an elementary mass of the fluid passing through. The sectional area of $m$, normal to the radius of the bend, is "$a$" and its length $dx$. In turning the bend, the mass $m$ will be acted upon by a certain centrifugal force C, causing it to compress the fluid radially in front of it from a pressure $p$ to a pressure $p+dp$. The increase in pressure on the area "$a$" must manifestly at all instants balance the centrifugal force C; hence we have $$adp = C = mx\omega^2$$

and substituting $$m = \frac{\delta}{g} adx,$$

when $g$ is the acceleration due to gravity, we get the general equation $$\frac{dp}{\delta} = \frac{\omega^2}{g} xdx \quad (1)$$

With respect to the density of the fluid, the quantity $\delta$ in the above equation, three assumptions may be made:—1, that it remains unchanged during the flow, as in the case with respect to water; 2, that it changes according to the laws of isothermal compression as in the case of a saturated vapor; 3, that it changes according to the laws of adiabatic compression as in the case of a permanent gas.

Assuming (1) $\delta$ to be a constant quantity, then we obtain from the general equation (1)

$$\frac{1}{\delta}\int_{p=p_1}^{p=p_2} dp = \frac{\omega^2}{g}\int_{x=r}^{x=R} xdx$$

and through integration $$\frac{p_2 - p_1}{\delta} = \frac{\omega^2}{2g}(R^2 - r^2)$$

But, as $\frac{p_2}{\delta}$ and $\frac{p_1}{\delta}$ are pressure-heads expressed in feet head of the fluid corresponding to the pressures $p_2$ and $p_1$ we may write $$\frac{p_2 - p_1}{\delta} = h_2 - h_1$$

and obtain $$\frac{\omega^2}{2g}(R^2 - r^2) = h_2 - h_1$$

Let $Vm$ be the mean linear velocity of the fluid flowing through the bend. Thus $$Vm = \omega \frac{R+r}{2}$$

Or $$\omega^2 = \frac{4Vm^2}{(R+r)^2}$$

Then through substitution $$\frac{Vm^2}{2g} \times \frac{4(R^2 - r^2)}{(R+r)^2} = h_2 - h_1$$

Or $$\frac{Vm^2}{2g} = \frac{R+r}{4(R-r)}(h_2 - h_1)$$

Finally, call $R - r = D =$ the diameter or width of the channel, and $\rho = \frac{R+r}{2} =$ the mean radius of the bend; and we get $$\frac{Vm^2}{2g} = \frac{\rho}{2D}(h_2 - h_1)$$

which may be written $$Vm = \sqrt{\frac{\rho}{2D}}\sqrt{2gh} \quad (2)$$

when $h = (h_2 - h_1)$ is the difference in pressure-head at the outer and inner wall of the bend.

The corresponding equation for the well known Pitot tube is $$V = \sqrt{2gh}$$

Assuming (2) the density of the fluid flowing through the bend to change according to the laws of isothermal compression, then the general equation (1) may be integrated into $$Vm = \sqrt{\frac{\rho}{2D}}\sqrt{2g144\frac{p_1}{\delta}\log_e\frac{p_2}{p_1}} \quad (3)$$

and the corresponding equation for the Pitot tube is $$V = \sqrt{2g144\frac{p_1}{\delta}\log_e\frac{p_2}{p_1}}$$

Finally, assuming (3) the density of the fluid to change according to the laws of adiabatic compression, then equation (1) becomes after integration $$Vm = \sqrt{\frac{\rho}{2D}}\sqrt{2g144\frac{p_1}{\delta}\frac{n}{n-1}\left(\left(\frac{p_2}{p_1}\right)^{\frac{n-1}{n}}-1\right)} \quad (4)$$

and the corresponding equation for the Pitot tube is $$V = \sqrt{2g144\frac{p_1}{\delta}\frac{n}{n-1}\left(\left(\frac{p_2}{p_1}\right)^{\frac{n-1}{n}}-1\right)}$$

A comparison between each set of equations will show that the formula for the velocity of flow through the flow-bend is, in each case, exactly the same as the corresponding formula for the Pitot tube, with the factor $$\sqrt{\frac{\rho}{2D}}$$

adjoined. This will of course also be the case with respect to the formulas for volume of flow and weight of flow. In other words, the pressure-head, $h$, indicated by the manometer tube will for the same velocity in the case of the flow-bend be $\frac{2D}{\rho}$ of the pressure head indicated by the Pitot tube. The quantity $\frac{2D}{\rho}$ may ordinarily be 1½ to 2, and hence, the pressure head indicated by the flow bend will for the same velocity be one and a half to twice the head indicated by the Pitot tube. This will of course with respect to small velocities be a feature of considerable advantage in favor of the flow-bend.

Having thus described my invention, what I claim is:—

1. In a flow measuring apparatus, a curved channel or flow bend provided with a plurality of pressure ports arranged in a circumferential line in its inner and outer curved walls and means for determining the difference between the pressure obtaining in the ports in the outer curved wall and that obtaining in the ports in the inner curved wall.

2. In a flow measuring apparatus, a curved channel or flow bend provided with a plurality of pressure ports in its outer and inner curved walls arranged in a circumferential line, means connecting all the ports in the outer wall, means connecting all the ports in the inner wall and means for determining the difference between the pressure obtaining in said first named means and the pressure obtaining in the second named means.

3. In a flow measuring apparatus, a curved channel or flow-bend provided with a plurality of radial pressure ports spaced successively in a circumferential line along its outer curved wall and with a plurality of radial pressure ports spaced successively in a circumferential line along its inner curved wall, and means for determining the difference between the mean pressure obtaining in the ports in the outer curved wall and the mean pressure obtaining in the ports in the inner curved wall when a fluid is passed through the flow-bend.

4. In a flow measuring apparatus a curved channel or flow-bend provided with a plurality of radial pressure ports spaced successively in a circumferential line along its outer curved wall and a plurality of radial pressure ports spaced successively in a circumferential line along its inner curved wall, a pressure chamber communicating with said first named ports, a pressure chamber communicating with said second named ports and means for measuring the pressure difference established in said pressure chambers when a fluid is passed through the flow-bend.

5. In a flow measuring apparatus, a curved channel or flow-bend, a removable nozzle plug comprising a pressure chamber and a plurality of pressure ports arranged in a circumferential line which communicate with the channel or flow-bend and the pressure chamber said nozzle plug extending through the outer curved wall of the curved channel or flow-bend, a second removable nozzle plug comprising a pressure chamber and a plurality of pressure ports arranged in a circumferential line communicating with the channel or flow-bend and the pressure chamber, said second named plug extending through the inner curved wall of the curved channel or flow-bend and means for measuring the pressure difference existing between said pressure chambers when a fluid is passed through the curved channel or flow-bend.

6. In a flow measuring apparatus, a curved channel or flow-bend of a definite cross sectional area and radius of curvature, a nozzle plug comprising a pressure chamber and a plurality of pressure ports arranged in a circumferential line communicating with the pressure chamber and having its inner extremity conforming to the general conformation of the channel or flow-bend, said plug extending through the outer curved wall of the channel or flow-bend, a second nozzle plug comprising a pressure chamber and a plurality of pressure ports arranged in a circumferential line communicating with the pressure chamber and having its inner extremity conforming to the general conformation of the channel or flow-bend, said second plug extending through the inner curved wall of the chamber or flow-bend and means for measuring the difference in the pressures existing in said pressure chambers when a fluid is passed through the curved channel or flow-bend.

In testimony whereof I have signed my name to this specification in presence of two subscribing witnesses this 10th day of April, A. D. 1914, at Chicago, Illinois.

ARVID M. LEVIN.

Witnesses:
W. HARDING,
M. BERG.